United States Patent [19]

Tung

[11] 4,452,965

[45] Jun. 5, 1984

[54] RANDOM ELASTOMERIC COPOLYESTERS

[75] Inventor: William C. T. Tung, Tallmadge, Ohio

[73] Assignee: The Goodyear Tire & Rubber Company, Akron, Ohio

[21] Appl. No.: 518,851

[22] Filed: Jul. 29, 1983

[51] Int. Cl.$^3$ .................. C08G 63/66; C08G 63/68
[52] U.S. Cl. ................................ 528/173; 524/195;
525/420.5; 525/421; 525/432; 528/176;
528/194; 528/195; 528/206; 528/209
[58] Field of Search ............... 528/173, 176, 194, 195,
528/206, 209; 524/195; 525/420.5, 421, 432

[56] References Cited

U.S. PATENT DOCUMENTS

| | | | |
|---|---|---|---|
| 3,547,883 | 12/1970 | Kobayashi et al. | 528/209 |
| 3,700,540 | 10/1972 | Buteux | 528/209 |
| 3,816,368 | 6/1974 | Kobayashi et al. | 528/209 |
| 3,832,436 | 8/1974 | Harris et al. | 528/209 |
| 3,891,064 | 6/1975 | Wolfe, Jr. | 528/209 |

*Primary Examiner*—Lester L. Lee
*Attorney, Agent, or Firm*—Alvin T. Rockhill

[57] ABSTRACT

This invention relates to random elastomeric copolyesters containing units of low molecular weight glycol, poly(alkylene oxide)glycol, dimer acid and 1,2 bis(4-carbomethoxy phenoxy)ethane.

11 Claims, No Drawings

RANDOM ELASTOMERIC COPOLYESTERS

TECHNICAL FIELD

The invention described herein relates to random linear copolyesters having elastomeric properties and to shaped articles prepared from the polyesters.

BACKGROUND ART

The prior art discloses elastic polyester resins made of certain ordered block copolymers as disclosed in U.S. Pat. Nos. 3,023,192 and 3,954,689. Also, elastomeric properties are obtained in copolyesters having branched chain compounds in their structure as illustrated in U.S. Pat. No. 4,013,624 and esters that contain side chains as shown in U.S. Pat. No. 3,890,279. The present elastomeric copolyesters are random copolyesters and different from the prior art materials by being polymers that contain significant amounts of units derived from 1,2 bis(4-carboxmethoxy phenoxy)ethane, dimer acid and poly(alkylene oxide)glycol within the polymer chain. These materials crystallize rapidly into opaque solids that are tough and elastic. They have a wide range of service temperatures and can be extruded into rods, tubes, hose, filaments and films and they can be injection molded or rotational molded into tires and parts having industrial uses.

SUMMARY OF THE INVENTION

According to this invention there is provided random elastomeric copolyesters containing repeating long chain ester units and short chain ester units. The long chain esters units are derived from dimer acid, low molecular weight diols, long chain glycols and 1,2 bis(4-carbomethoxy phenoxy)ethane. The short chain ester units are derived from 1,2 bis(4-carbomethoxy phenoxy)ethane and low molecular weight glycols. The short chain ester units constitute 90–10.5% by weight of the polymer.

DETAILED DESCRIPTION

The present copolyesters can be made by the usual procedures for making high molecular weight polyesters, including ester interchange, esterification and polycondensation or a combination of these processes. They are essentially random straight chain polymers without any dangling (i.e. pendant) groups attached either to the acid residues or the glycol residues and are copolyesters in that they contain units of different polyester-forming materials within the polymer chains.

There is disclosed a random elastomer copolyester comprising a multiplicity of recurring long chain and short chain ester units connected head-to-tail through ester linkages, said long chain units being of the formula:

 (A)

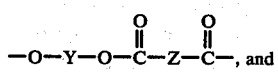 (B)

 (C)

and said short chain ester units being of the formula:

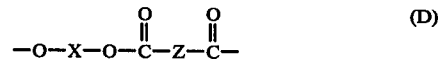 (D)

wherein:
W is a divalent radical remaining after removal of terminal carboxyl groups from dimer acid,
X is a divalent radical remaining after removal of hydroxyl groups from a low molecular weight glycol having a molecular weight of below 250;
Y is a divalent radical remaining after removal of terminal hydroxyl groups from poly(alkylene oxide) glycols having a carbon to oxygen ratio of 2.0–4.3, a molecular weight above 400 and a melting point below 60° C.; and
Z is a divalent radical remaining after removal of terminal methoxy group from 1,2 bis(4-carbomethoxy phenoxy) ethane; with the proviso that the short chain ester units constitute 90–10.5 weight percent of the copolyester.

The copolyesters of this invention contain from 90 to 10.5% by weight of short chain ester units corresponding to Formula D above, the remainder being long chain ester units corresponding to Formulas A, B and C above. When the copolyesters contain less than 10.5% by weight short chain units, the tensile strengths and thermal properties of the copolyesters fall to undesirably low levels and when the copolyesters contain more than 90% by weight short chain units, the elasticity and flexibility properties are undesirable.

The low molecular weight glycols (below 250) used in preparing the copolyester of the present invention are glycols having from 2 to 15 carbon atoms such as ethylene, propylene, 1,4 butene diol, isobutylene, pentamethylene, 2,2-dimethyltrimethylene, hexamethylene and decamethylene glycols, dihydroxy cyclohexane, cyclohexane dimethanol. Preferably aliphatic glycols containing from 2 to 8 carbon atoms. Most preferred is ethylene glycol. The term "low molecular weight glycol" as used herein should be construed to include such equivalent ester-forming derivatives; provided that the molecular weight requirement pertains to the glycol only and not to its derivatives.

As known to one skilled in the art a molar excess of the low molecular weight glycol, ranging from about 10 to about 200 percent of the number of moles of this diol needed to react with the moles of acid constituents or their respective equivalents in the mixture, is employed. This excess is employed in order to insure reasonable rates of reaction between the glycol constituents and the acid constituents or the reactive equivalents thereof. As a result of the use of this excess of the low molecular weight glycol, the molar ratio of all the glycol constituents to all of the acid constituents or their respective equivalents in the mixture will range from about 1.05:1 to about 2.20:1.

The dimer acid useful in preparing the copolyesters constituting the present invention is itself prepared from an unsaturated fatty acid containing 18 carbon atoms such as linoleic and linolenic acid or the monohydric alcohol esters thereof. The actual preparation and structure of dimerized C18 fatty acids are described in J.A.C.S. 66, 84(1944) and U.S. Pat. No. 2,347,562, both of which are incorporated herein by reference. Several different grades of dimer acid are available from commercial sources and these differ from each other primarily in the amount of the monomer and trimer acid fractions and the degree of unsaturation. It is preferred, for the purposes of this invention, the dimer acid be substantially free of the monomer and trimer acids fractions and essentially completely saturated. Two different grades of dimer acid, which are useful in preparing the copolyesters herein described and meet the above requirements and which are available from Emery Industries, Inc. under the tradename Empol, are Empol 1010 and Empol 1014. Empol 1010 dimer acid is reported as typically containing 97 percent dimer acid, 3 percent trimer acid and essentially no monobasic acids and extremely low unsaturation and Empol 1014 is reported as typically containing 95 percent, 4 percent and 1 percent of dimer, trimer and monobasic acids respectfully.

The long chain glycols are polymeric glycols having terminal hydroxy groups and a molecular weight above 400 and preferably about 1000. The long chain glycols used to prepare the copolyesters of this invention are generally poly(alkylene oxide) glycols or glycol esters of poly(alkylene oxide) dicarboxylic acids. The chemical structure of the long chain polymeric part of the long chain glycol is not critical and any substituent groups can be present which do not interfere with polymerization of the compound with glycol(s) or dicarboxylic acid(s), as the case may be, to form the polymers of this invention. Thus, the chain can be a single divalent acylic, alicyclic, or aromatic hydrocarbon group, poly(alkylene oxide) group, polyester group, a combination thereof, or the like which meets the other requirements set forth herein and any of these can contain substituents which do not interfere to a substantial extent with polymerization to form copolyesters of this invention. The hydroxy fundamental groups of the long chain glycols which react to form the copolyesters should be terminal groups to the extent possible.

The elastomeric, random, linear copolyesters of the present invention and derived from the reaction mixtures defined hereinabove are prepared by conventional and well-known techniques used in preparing high molecular weight polyesters. In general, the copolyesters are prepared by first subjecting the mixture of reactants to elevated temperatures under an inert gas atmosphere at atmospheric or subatmospheric pressures in the presence of a catalyst to promote the esterification or combined transesterification/esterification reactions, depending on the nature of the starting materials, between the glycol constituents and the acid constituents or reactive equivalents thereof comprising said mixtures.

Known catalysts useful in promoting these reactions include the zinc, magnesium, calcium, manganese, lead and titanium containing compounds. The amount of catalyst used can be varied over a wide range. Generally the amount used will be in the range of from 0.005 to about 0.03 percent by weight based on the amount of reactants used.

The temperatures normally employed to effect the esterification or combined transesterification/esterification reactions will generally range from about 150° C. to about 240° C. and preferably from about 190° C. to 230° C.

Following completion of the esterification or combined transesterification/esterification reaction, the low molecular weight oligmer product produced thereby is subjected to polycondensation. The polycondensation reaction will be carried out at temperatures ranging from 220° C. to 280° C. and preferably from 240° C. to 270° C. at pressures below 15 and preferably below 1 millimeter of mercury (mm HG) pressure in the presence of a polycondensation catalyst such as the known antimony, titanium, iron, zinc, cobalt, lead, manganese, niobium or germanium catalysts.

Optionally, small amounts of chain branching agents may be added to the esterification or transesterification mixture. One chain branching agent can be represented by the general formula:

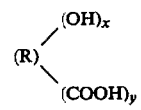

where x is from 0 to 6 and y is from 0 to 6, and x plus y is 3 or more with a maximum of 12. R is an alkyl having from 4 to 20 carbon atoms, a cycloalkyl having from 4 to 10 carbon atoms, an aromatic having from 6 to 10 carbon atoms, an alkyl substituted aromatic having from 7 to 15 carbon atoms, and combinations thereof. The amount of these chain branching agents desirably ranges from 0.05 to 1.0 parts per weight per 1000 parts by weight of resultant or final copolyester polymer produced and preferably from 0.2 to 0.4 parts by weight.

Other chain branching agents are ionic compounds having the formula:

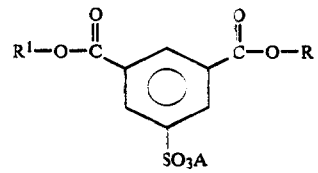

where A is an alkali radical and where R and $R^1$ are alkyls having from 1 to 4 carbon atoms. The amount of the alkali dialkyl sulfoisophthalate compound ranges from 0.1 to 5.0 mole percent of the total moles of acid used in making the copolyester elastomer.

Optimally known carbodiimides can be added to the elastomeric copolyesters to improve the hydrolytic and thermal stability. Various mono-carbodiimides and bis-carbodiimides can be used such as those corresponding to the formula:

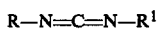

and

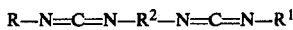

wherein R, $R^1$ and $R^2$ are substituted and unsubstituted radicals selected from the group consisting of $C_4$-$C_{20}$ alkyl radicals, cycloalkyl radicals and aryl radicals, the substitutions being selected from the group consisting of halogen atoms, nitro groups, amino groups, sulfonyl groups, hydroxyl groups and alkyl and alkoxyl radicals and wherein R, $R^1$ and $R^2$ may or may not be the same.

The properties of these copolyesters can be modified by incorporation of various conventional inorganic fillers such as chopped fiberglass, silica gel, alumina, clays and carbon black. Generally these inorganic fillers increase the modulus of the material at various elongations. Compounds having a range of hardness values can be obtained by blending hard and soft copolyesters of this invention.

All intrinsic viscosity numbers hereinafter referred to as IV, were measured in a 60/40 phenol/tetrachloroethane mixed solvent at 30° C.

The following example illustrate the preparation of the copolymers of the present invention. In these examples parts or percentages are by weight unless specified otherwise.

EXAMPLE 1

An elastomeric, random linear copolyester was prepared from a mixture of reactants consisting of 30 grams of BCE, 40 grams of ethylene glycol, 15 grams of dimer acid (Empol TM 1014) and 15 grams of poly(tetramethylene oxide) glycol having a molecular weight of about 1,000 (polymeg 1,000). The reactants were charged in a glass reactor. The first stage transesterification was carried out under nitrogen atmosphere at 190° with 0.1 grams of magnesium acetate and and 0.3 milliliters of 1 percent titanium from tetrabutyl titanate in ethylene glycol solution. After all the bi-product methanol was distilled out, 0.2 grams of Naugard TM 445 and 0.2 gram of Sb$_2$O$_3$ were added. The temperature of the reaction mixture was raised to 260° while the pressure was slowly reduced to 0.3 millimeters of mercury. This polycondensation reaction was carried out for 2.5 hours. The product was then discharged. The product had an intrinsic viscosity of 0.92 and a melting point of 200° C.

The elastomeric copolyesters of this invention are characterized by high strength and high stretch modulus. These copolymers may be spun readily into yarns and into low denier filaments. The yarns prepared from these copolyesters will find many uses in the textile and reinforced rubber fields.

Films of copolyesters of the present invention are useful in a number of applications. They can be used as protective films to package textiles, tires, tubes and other rubber products. They can also find use in liners for various products such as hoses. The copolyesters of the present invention can also be injection molded or blow molded in a variety of products.

If desired, the properties of these copolyesters can be modified somewhat by the incorporation of plasticizers, lubricants, and pigmenting agents.

As set out before the copolyesters will have a melting point in the range of from 190° C. to about 240° C. This broad range of melting points allows for a wide range of service temperatures for these copolyesters.

The expression "melting point" of the copolyesters as used in this specification is the minimum temperature at which a sample polymer leaves a wet molten trail as it is drawn across the surface of a heated block of aluminum. Sometimes this temperature is called a polymer stick temperature.

Stabilizers may be added to the copolyesters to provide additional stability against the deteriorating affects of heat or light. Phenols, amines, oximes, and salts of metals are suitable stabilizers.

While certain representative embodiments and details have been shown for the purposes of illustrating the invention, it will be apparent to those skilled in the art that various changes and modifications may be made therein without departing from the spirit or scope of the present invention.

I claim:

1. A random elastomeric copolyester comprising a multiplicity of recurring long chain and short chain ester units connected head-to-tail through ester linkages, said long chain units being of the formula:

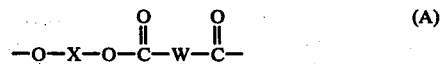

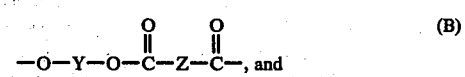

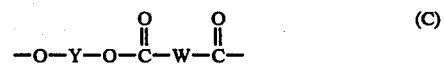

and said short chain ester units being of the formula:

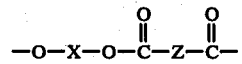

wherein:
W is a divalent radical remaining after removal of terminal carboxyl groups from a dimer acid prepared from an unsaturated fatty acid containing 18 carbon atoms or the monohydric alcohol esters thereof;
X is a divalent radical remaining after removal of hydroxyl groups from a low molecular weight glycol having a molecular weight of below 250;
Y is a divalent radical remaining after removal of terminal hydroxyl groups from poly(alkylene oxide) glycols having a carbon to oxygen ratio of 2.0–4.3, a molecular weight above 400 and a melting point below 60° C.; and
Z is a divalent radical remaining after removal of terminal methoxy group from 1,2 bis(4-carbomethoxy phenoxy) ethane; with the proviso that the short chain ester units constitute 90–10.5 weight percent of the copolyester.

2. A random elastomeric copolyester of claim 1 wherein the short chain ester units constitute 70 to 40 weight percent of the copolyester.

3. A random elastomeric copolyester of claim 1 wherein the diol having a molecular weight less than 250 is ethylene glycol.

4. A random elastomeric copolyester of claim 1 wherein the poly(alkylene oxide)glycol is poly(tetramethylene oxide)glycol having a molecular weight of about 600 to about 2000.

5. A random elastomeric copolyester of claim 1 wherein the dimer acid is substantially free of monomer and trimer acid fractions and is substantially saturated.

6. A random elastomeric copolyester according to claim 1 in the form of a film.

7. A random elastomeric copolyester according to claim 1 in the form of a molded product.

8. A random elastomeric copolyester according to claim 1 in the form of a filament.

9. The random elastomeric copolyesters of claim 1 wherein there is added 0.05 to 1.0 parts per weight of a branching compound, said parts per 1000 parts by weight of resultant copolyesters produced wherein said branching compound is of the formula:

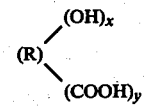

where x is from 0 to 6 and y is from 0 to 6, and x plus y is 3 or more with a maximum of 12 and R is an alkyl having from 4 to 20 carbon atoms, a cycloalkyl having from 4 to 10 carbon atoms, an aromatic having from 6 to 10 carbon atoms, an alkyl substituted aromatic having from 7 to 15 carbon atoms, and combinations thereof.

10. The random elastomeric copolyesters of claim 1 wherein an ionic chain branching agent is added, wherein said chain branching agent is of the formula:

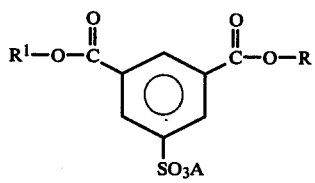

where A is an alkali radical and where R and $R^1$ are alkyls having from 1 to 4 carbon atoms and wherein said chain branching agent is in the amount of 0.1 to 5.0 mole percent based on the total moles of acid used in making the copolyester elastomer.

11. The random elastomeric copolyesters of claim 1 wherein there is added at least one carbodiimide of the following formula:

and

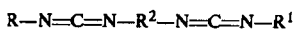

where R, $R^1$ and $R^2$ are substituted or unsubstituted radicals selected from the group consisting of $C_4$ to $C_{20}$ alkyl radicals, cycloalkyl radicals and aryl radicals, the substitutions being selected from the group consisting of halogen atoms, nitro groups, amino groups, sulfonyl groups, hydroxyl groups and alkyl and alkoxy radicals and wherein R, $R^1$ and $R^2$ may or may not be the same.

* * * * *